Sept. 5, 1961  J. W. HORNER, JR  2,999,028
NON-THIXOTROPIC FLOUR ADHESIVES AND METHODS THEREFOR
Filed Sept. 16, 1958
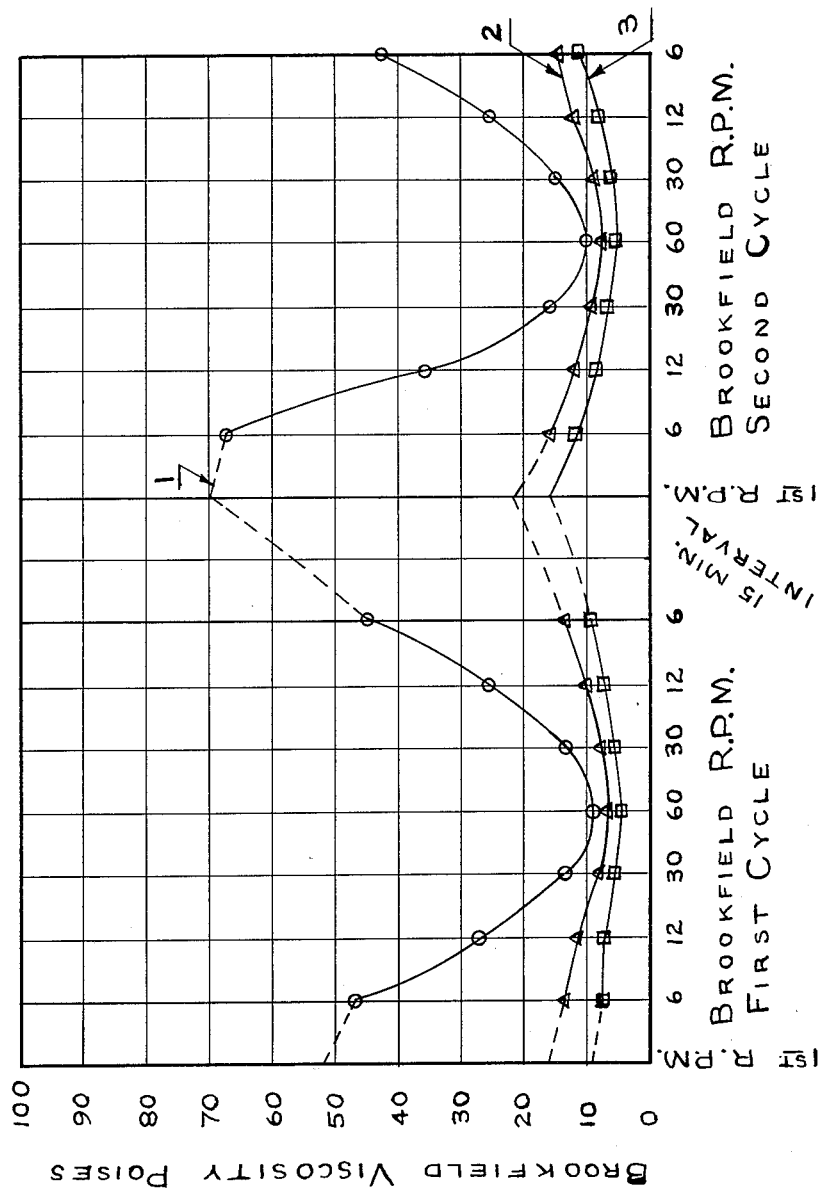
INVENTOR
JAMES W. HORNER, Jr.
BY
ATTORNEY

United States Patent Office 2,999,028
Patented Sept. 5, 1961

2,999,028
NON-THIXOTROPIC FLOUR ADHESIVES AND METHODS THEREFOR
James W. Horner, Jr., Minneapolis, Minn., assignor to Daniels-Midland Company, Hennepin, Minn., a corporation of Delaware
Filed Sept. 16, 1958, Ser. No. 761,350
5 Claims. (Cl. 106—150)

This invention relates to an improvement in flour corrugating and laminating adhesive compositions and the method for preparing non-thixotropic adhesives based principally upon ungelatinized cereal flours. More particularly the invention concerns the use of waxy starches or flours in combination with cereal flours preferably with reference to grain sorghum flour and less preferably other cereal and like flour materials, in overcoming thixotropy and especially providing an improvement in cereal flour corrugating adhesives.

Corrugating adhesives, as presently used in the industry, are prepared in two portions, a "carrier" and a "secondary." These portions are then combined to give the final adhesive. The carrier generally consists of a viscous aqueous alkaline solution of gelatinized starch. The secondary consists of an aqueous suspension of ungelatinized starch. Cereal flour material, in the secondary, mixed with normal starch is thixotropic. This is very evident in the case of corrugating adhesives. When the more economical starchy flours are used in such adhesives in place of corn starch, the resulting adhesives also have disadvantageous properties.

One of the disadvantageous properties manifested by flour-based adhesives is their thixotropic property. Consequently flours, as such, are not ordinarily practical for corrugating machine operation. In large scale operations this thixotropy causes improper flow and ridging or rippling on the applicator roll. This results in uneven and wasteful application. Furthermore, the flow of the adhesive in the supply pan is insufficient to properly wet the coating roller to obtain the best application. As indicated, it is recognized that refined starches of reduced, or very low, protein content have heretofore been used in corrugating adhesives. For economic reasons it is very desirable to make use of cereal flours in lieu of starches. Although the use of flour by the adhesive industry has been attempted, flour has not proven satisfactory as shown by the continued use of starch, and attempts made to modify flour material with silicates.

Many types of prepared starches are available for industrial purposes and are regularly used for paper and textile sizes, adhesives, food products, salad dressings, puddings, canned foods, confections, and the like. In this case a large variety of product viscosities is possible depending upon the source of the starch, its method of treatment and degree of cooking. Generally, starches in this group are corn, waxy maize, tapioca, sago, potato, wheat, rice, arrowroot, sorghum and sweet potato. Usually, the corresponding flours from the same sources cannot be used in place of the starches to achieve the same end use product and/or properties.

There are cases where waxy starch, especially waxy corn starch, is added to regular corn starch or other starches to act as a stabilizer by reducing their paste viscosities and the tendencies of the regular starch pastes to gel. This is a known use for waxy starch. However, such mixtures are not known to be machine operable as corrugating and laminating adhesives.

Thus, it will be recognized that there is a need for making cereal flour materials more directly applicable to corrugating machines.

It is therefore an object of this improvement to provide non-thixotropic adhesives, based on the combination of waxy corn starch with ungelatinized cereal flour material to overcome and eliminate the above problems with flour adhesives.

It is another object of this improvement to provide a waxy flour or waxy starch in the carrier portion of a flour-based corrugating adhesive, to reduce the thixotropy and improve the flow characteristics of the adhesive.

It is still another object of this improvement to provide a waxy flour or waxy starch in the carrier portion of a corrugating adhesive and to produce a flour base adhesive of reduced thixotropy when corn, rice, wheat, oat, rye, sorghum or other like cereal flours are used in the secondary of the adhesive composition.

To accomplishment of the foregoing and related ends, this improvement then comprises the features hereinafter more fully described and inherent therein, and as particularly pointed out in the claims. The following description sets forth in detail certain illustrative embodiments of the improvement, these being indicative, however, of but a few of the various ways in which the embodiments of the disclosure may be employed.

The discovery upon which this invention is based lies in the use of a powdered waxy material in the form of waxy flour or waxy starch in the carrier portion of the corrugating adhesive, as described, with a flour material, preferably cereal grain flours and less preferably root flours, in the secondary portion of the said adhesive. This is different than the use of normal gelatinized corn starch with ungelatinized starches as known in this art. Thus, it has been discovered that it is possible to produce cereal flour based corrugating adhesives, with desirable flow characteristics, by utilizing waxy starches and waxy flours in the carrier and essentially cereal or less preferably root flours in the secondary, as herein described.

For a clarification and understanding of the waxy materials utilized herein, the following differentiation and distinction over ordinary starches and normal flour is submitted. Starch consists of long chains of anhydroglucose residues. It is well established that most starches consist of two different components. In one of them, called amylose, the molecular structure is that of an unbranched chain. In the other, called amylopectin, the anhydroglucose chains are branched. Ordinary corn starch, for example, contains about 73% of amylopectin and about 23% of amylose. In certain varieties of cereal grains, however, the composition of the starch component is substantially 100% amylopectin. It is these latter varieties which are referred to by the term "waxy," in relationship to the peculiar waxy appearance manifested by the inside of the kernel when it is cut.

The best known waxy variety of substantially 100% amylopectin content is waxy corn starch. The solubility and cooking characteristics of waxy corn starch are different from those of regular corn starch. Thus, a regular corn starch paste is cloudy, tends to set or gel and is thixotropic with cereal flours, whereas a paste of waxy corn starch is clear, fluid and cohesive.

The term "waxy starches or waxy flours" as used herein with reference to the "carrier" is intended to include waxy corn starch, modified waxy corn starch, whole waxy corn flour, waxy sorghum starch, dehulled degermed waxy sorghum flour, whole waxy sorghum flour, waxy rice flour and the like. When these same flours are used, in the secondary, with a non-waxy component in the carrier, thixotropic adhesives are the expected results.

The term "flour," as used herein, is generally understood to mean a pulverized product prepared from vegetable material with a minimum amount of separation or purification of the constituents. For example, in the preparation of a flour from a cereal grain, the amount of separation or purification, if any, usually extends only to the separation and removal of the hull and germ. The constituents of the endosperm, which is pulverized to yield the flour, are not separated. As a result, the flour contains characteristic and usual amounts of protein, oil, hemicelluloses and metallic salts. Starch, on the other hand, is prepared from the same vegetable materials by more complex processes which yield products containing only very small amounts, if any, of the non-starch constituents of the original material.

Such flour materials are derived from the sources above described for "waxy starches and waxy flours" and include preferably such other cereal flours as wheat, oat and rye, and less preferably root flours as illustrated by tapioca flour.

To more clearly define this invention, or improvement in cereal flour corrugating adhesives, carrier and secondary adhesive compositions, including the method for evaluating thixotropy, within the limits of this improvement, are hereinafter illustrated.

My carrier compositions are formulated within the limits as follows:

Part 1 (carrier): Parts by weight
A. Water _____ 97–156
B. Waxy starch or waxy flour_____ 24–33
C. Caustic soda (monovalent alkali)____ 4.9–7.4
D. Water for caustic soda_____ 13–21
E. Cooling water_____ 128–206

The carrier compositions were prepared by adding the waxy starch or flour, B, to the water, A, contained in a suitable vessel equipped with agitator and heating elements. The caustic soda, C, previously dissolved in the requisite water, D, was added rapidly to the waxy starch or waxy flour slurry while stirring rapidly. At that point the concentration of the caustic soda was high enough to gelatinize the starch or flour, without the application of heat. However, the preferred method is to heat the carrier composition to within the temperature range of 110°–180° F. and most preferably to about 145°–160° F. for a period of from about 8 to about 20 minutes, and preferably about 15 minutes. Stirring was maintained throughout this heating period. The cooling water, E, was next added rapidly and agitation was continued for 5 minutes more. The carrier was then ready for addition to a secondary as described below.

The function of the caustic soda is to lower the gelatinization temperature of the ungelatinized flour (added via the secondary as described below) to the point where said ungelatinized flour gelatinizes in situ after the adhesive has been applied to the corrugated board and as the corrugated board is subjected to heat in the corrugating machine. Other strong alkalies have the same effect. For example, in place of the caustic soda in the typical carrier formula above, one may use from 6.9 to 10.4 parts of potassium hydroxide.

The secondary was preferably made simultaneously with the carrier. My secondary compositions are formulated within the limits as follows:

Parts by weight
F. Water _____ 571–715
G. Borax _____ 4.9–7.4
H. Flour (cereal or root)_____ 193–243

The secondary was prepared by adding the flour, H, to a solution of the borax, G, in the water, F, and agitating until a smooth mixture was obtained.

Next, and with very rapid agitation, the carrier was added slowly to the secondary over a period of about 15–20 minutes. After both components had been thoroughly mixed, the temperature was noted and the viscosity was determined by the Penick and Ford method. Penick and Ford viscosity is the time (in seconds) required for 100 ml. of the adhesive to flow through an orifice of standard size. Standard instruments for this determination are commonly used in the corrugating industry.

The adhesive was next homogenized by further very vigorously mixing with an Eppenbach mixer for 10 minutes followed by another Penick and Ford viscosity determination. The purpose of the Eppenbach mixing was to simulate, in the laboratory, the vigorous mechanical action applied to a corrugating adhesive in a corrugating plant as it is continuously pumped from a storage tank to the adhesive pans of the corrugating machine and back to the storage tank. The adhesive was now ready for use and further testing.

In the final adhesive composition, the best results are obtained when there is present about between 10% and 20% of the waxy components based on the solids. In the compounding of the carrier, a portion of the waxy component may be substituted by a non-waxy component. When sorghum flour was used in the secondary and a mixture of waxy corn starch with regular corn starch was used in the carriers, the thixotropy decreased as the percentage of waxy corn starch increased. Some reduction in thixotropy has been observed also when potato starch, tapioca flour and a converted hydroxyethylated starch were used in lieu of the waxy component in the carrier, with a sorghum flour in the secondary.

As heretofore indicated, some typical flours which are preferably used, in the secondary portion of the adhesive composition, with a waxy component in the carrier to produce my corrugating laminating adhesives, as described, are e.g. sorghum, corn, rice and wheat flours. The final adhesive solids preferably contains between about 80% and 90% of these flours. The borax component is the preferred material, as it has afforded the best results. However, other borate salts of the di-, hypo-, meta-, ortho-, per-, pyro-, and tetra-borates may be used in equivalent workable proportions.

The above description is best illustrated by the following specific examples:

*Example 1*

This example represents a non-thixotropic adhesive made according to the typical formula and procedure given above, utilizing whole waxy grain sorghum flour in the carrier and grain sorghum flour in the secondary.

Part 1 (carrier): Parts by weight
A. Water _____ 145.2
B. Whole waxy grain sorghum flour_____ 32.0
C. Caustic soda_____ 6.6
D. Water for caustic soda_____ 19.7
E. Cooling water_____ 128.3

Part 2 (secondary):
F. Water _____ 709.2
G. Borax _____ 6.2
H. Grain sorghum flour_____ 214.0

The adhesive was prepared by the procedure described above, the carrier being heated at 160° F. for 15 minutes. The Penick and Ford viscosity of the adhesives was 31.9 seconds at 90° F.

The thixotropic property of an adhesive as prepared above can best be measured by the Brookfield viscometer. For example, a sample of this adhesive was placed in an 800 ml. beaker. The spindle was lowered into the adhesive and permitted to rotate one minute at each speed prior to taking readings at 6, 12, 30, 60, 30, 12 and 6 revolutions per minute in that order.

Cycles of Brookfield viscosities were determined, as follows:

| R.p.m.: | Viscosity, poises |
|---|---|
| 6 for 1 min | 13.6 |
| 12 for 1 min | 10.7 |
| 30 for 1 min | 7.7 |
| 60 for 1 min | 6.0 |
| 30 for 1 min | 7.6 |
| 12 for 1 min | 9.8 |
| 6 for 1 min | 14.0 |

After the adhesive had stood undisturbed for 15 minutes, without removing the spindle, the same cycle was repeated, as follows:

| R.p.m.: | Viscosity, poises |
|---|---|
| 6 for 1 min | 15.4 |
| 12 for 1 min | 11.6 |
| 30 for 1 min | 8.3 |
| 60 for 1 min | 6.4 |
| 30 for 1 min | 8.0 |
| 12 for 1 min | 11.3 |
| 6 for 1 min | 14.0 |

A final Penick and Ford viscosity determination showed a reading of 33 seconds.

Illustrative and comparative typical Brookfield viscosity curves of the herein described non-thixotropic adhesives and a conventional type having thixotropy are shown in the accompanying drawing. Curve 1 from Example 3 is typical of a thixotropic adhesive. At the lower spindle revolution the viscosity appeared to be the highest, approaching a minimum at 60 revolutions and reaching a maximum as 6 revolutions are again approached. The non-thixotropic adhesives shows a fairly constant viscosity over the same spindle revolutions, as shown by curves 2 and 3 from Examples I and II, respectively. Thus, it is shown that the desirable properties of the non-thixotropic vehicles can readily be measured or recorded via the Brookfield viscosities at the several spindle speeds. The straightness, as characterized by curves 2 and 3, indicates the relative lack of thixotropity of the adhesive.

The adhesives which have Brookfield viscosities of not over 25 poises at the beginning and end of the viscosity measurement cycles at 6 revolutions per minute are considered as having the desired non-thixotropy. However, for best results the preferred compositions are those wherein the Brookfield viscosities are not over about 10 at any spindle speed during the measurement cycle.

*Example II*

This example illustrates the preparation of a non-thixotropic adhesive based on the use of waxy corn starch in the carrier and grain sorghum flour in the secondary.

| Part 1 (carrier): | Parts by weight |
|---|---|
| Water | 293.2 |
| Waxy corn starch | 24.6 |
| Sodium hydroxide | 6.6 |

The waxy corn starch was added at room temperature to 145 parts of the water contained in a vessel equipped with heating and a stirring device. The sodium hydroxide, previously dissolved in about 20 parts of the water portion was then added rapidly to the starch-water mixture. With constant stirring, the mixture was heated to 140° F. and held for 15 minutes. The balance of the water, 128.2 parts, was added rapidly and stirring was continued for 5 minutes.

| Part 2 (secondary): | Parts by weight |
|---|---|
| Water | 709.3 |
| Grain sorghum flour | 209.0 |
| Borax | 6.1 |

The secondary and carrier were prepared at the same time.

A slurry of the secondary components was prepared by simply mixing in an open vessel equipped with a good agitator. As soon as the secondary components were thoroughly mixed the simultaneously prepared carrier was slowly added and thoroughly mixed. Further mixing was completed with an Eppenbach mixer for 10 minutes.

The Penick and Ford viscosity at this point was 28.3 seconds at 89° F.

Brookfield viscosities at 84° F. were run by lowering the spindle and running it for one minute at each speed before recording the viscosity at that spindle speed.

The viscosity readings were recorded as follows:

| R.p.m.: | Viscosity, poises |
|---|---|
| 6 for 1 min | 7.2 |
| 12 for 1 min | 6.9 |
| 30 for 1 min | 5.5 |
| 60 for 1 min | 4.2 |
| 30 for 1 min | 5.4 |
| 12 for 1 min | 7.4 |
| 6 for 1 min | 8.8 |

After allowing the adhesive to stand 15 minutes undisturbed (spindle not removed), the same cycle was repeated, as follows:

| R.p.m.: | Viscosity, poises |
|---|---|
| 6 for 1 min | 11.4 |
| 12 for 1 min | 8.8 |
| 30 for 1 min | 6.4 |
| 60 for 1 min | 4.9 |
| 30 for 1 min | 6.2 |
| 12 for 1 min | 7.9 |
| 6 for 1 min | 10.6 |

These data are plotted as curve 3 in the drawing. The straightness indicates lack of thixotropy.

*Example III*

This example illustrates, as a control, the preparation of a typical thixotropic adhesive based on corn starch in the carrier and sorghum flour in the secondary.

| Part 1 (carrier): | Parts by weight |
|---|---|
| Water | 232.5 |
| Corn starch | 13.7 |
| Sodium hydroxide | 5.2 |

| Part 2 (secondary): | Parts by weight |
|---|---|
| Water | 562.4 |
| Grain sorghum flour | 181.3 |
| Borax | 4.9 |

The above components were combined as described in Example II. The adhesive had a Penick and Ford viscosity of 28.8 seconds at 87° F.

The cycle for the Brookfield viscosities were as follows:

| R.p.m. | First Cycle, poises | Second Cycle, poises |
|---|---|---|
| 6 | 46.2 | 66.8 |
| 12 | 26.3 | 34.1 |
| 30 | 12.8 | 15.0 |
| 60 | 7.5 | 8.3 |
| 30 | 12.2 | 12.8 |
| 12 | 25.1 | 24.7 |
| 6 | 45.4 | 43.8 |

These data are plotted as curve 1 in the figure. The U shape indicates thixotropy.

*Example IV*

This example illustrates the preparation of a non-thixotropic adhesive based on the use of refined waxy sorghum flour in the carrier and grain sorghum flour in the secondary.

| Part 1 (carrier): | Parts by weight |
|---|---|
| Water | 293.2 |
| Refined waxy sorghum flour | 27.0 |
| Potassium hydroxide | 9.3 |

Part 2 (secondary):
    Water _____ 709.3
    Grain sorghum flour _____ 209.0
    Borax _____ 6.1

The above components were combined as illustrated in Example II.

The adhesive had a Penick and Ford viscosity of 27.0 seconds at 87° F.

The cycles for the Brookfield viscosities were as follows:

| R.p.m. | First Cycle, poises | Second Cycle, poises |
|---|---|---|
| 6 | 7.0 | 9.3 |
| 12 | 6.0 | 7.3 |
| 30 | 4.5 | 5.3 |
| 60 | 3.6 | 4.0 |
| 30 | 4.5 | 5.1 |
| 12 | 6.0 | 6.9 |
| 6 | 7.6 | 9.0 |

The variations in spindle speed caused only a very slight variation in viscosity. This indicates the absence of thixotropy.

The components were combined as described in Example II. The adhesive had a Penick and Ford viscosity of 33.7 seconds at 93° F. The Brookfield viscosities determined the absence of thixotropy within the limits defined.

Further beneficial effects on the viscosity characteristics are shown in Table 1 of comparative data in which a waxy starch or waxy flour is used in the carrier. In the listed adhesives, the carrier contains between 5% and 8.5% of the waxy component (based on total weight of carrier) while the secondary contains between 22% and 25% of a flour (based on total weight of secondary). This range of carrier and secondary components yields adhesives with Penick and Ford viscosities of 25 to 45 seconds, depending upon the type of flour. However, Penick and Ford viscosities of 27 to 35 seconds are generally preferred. Embodied in the examples, as herein described, the water compositions of the corrugating and laminating adhesives are formulated and measured at between about 5% to 25% solids level and by calculation not over about a 25% solids level.

The examples in Table 1 were prepared by the standard procedure of Example II, except that the carriers were heated to 160° F. instead of to 140° F.

TABLE 1

*Thixotropy of flour based adhesives as related to "waxy" component in the carrier*

| | Carrier | Secondary | Penick & Ford Viscosity in Sec. | Brookfield Viscosity in Poises | | | | | | Thixotropy |
|---|---|---|---|---|---|---|---|---|---|---|
| | | | | 1st cycle at— | | | 2nd cycle at— | | | |
| | | | | 6 r.p.m. | 60 r.p.m. | 6 r.p.m. | 6 r.p.m. | 60 r.p.m. | 6 r.p.m. | |
| VI | Grain Sorghum Flour | Grain Sorghum Flour | 29.6 | 68.0 | 10.3 | 61.6 | 79.6 | 11.7 | 63.4 | Present. |
| VII | Corn Starch | ___do___ | 32.2 | 74.0 | 12.0 | 74.0 | 97.2 | 13.5 | 76.6 | Do. |
| VIII | Waxy Corn Starch | ___do___ | 33.2 | 19.0 | 8.3 | 20.0 | 21.0 | 9.0 | 20.6 | Absent. |
| IX | Amioca 50 [1] | ___do___ | 36.2 | 15.0 | 6.2 | 15.4 | 16.2 | 7.1 | 16.4 | Do. |
| X | Whole Waxy Corn Flour | ___do___ | 34.3 | 21.0 | 5.3 | 22.6 | 29.0 | 9.4 | 24.0 | Do. |
| XI | Waxy Sorghum Starch | ___do___ | 33.7 | 20.0 | 8.3 | 20.1 | 30.0 | 9.8 | 24.0 | Do. |
| XII | Refined Waxy Sorghum Flour | ___do___ | 32.2 | 17.4 | 7.0 | 17.0 | 18.6 | 7.7 | 17.4 | Do. |
| XIII | Whole Waxy Sorghum Flour | ___do___ | 33.0 | 15.2 | 6.5 | 16.4 | 20.6 | 8.1 | 19.6 | Do. |
| XIV | Waxy Rice Flour | ___do___ | 32.3 | 16.4 | 6.5 | 17.0 | 18.2 | 7.4 | 17.4 | Do. |
| XV | Corn Starch | Corn Flour | 26.2 | 49.8 | 7.7 | 51.0 | 57.6 | 8.3 | 45.6 | Present. |
| XVI | Waxy Corn Starch | ___do___ | 25.3 | 8.0 | 3.6 | 9.4 | 10.6 | 3.9 | 8.8 | Absent. |
| XVII | Rice Flour | Rice Flour | 27.0 | 38.0 | 6.7 | 34.6 | 50.0 | 7.4 | 34.4 | Present. |
| XVIII | Waxy Corn Starch | ___do___ | 30.0 | 14.0 | 6.1 | 16.0 | 23.6 | 7.4 | 19.6 | Absent. |
| XIX | Wheat Flour | Wheat Flour | 32.4 | 51.0 | 21.5 | 51.0 | 55.6 | 16.7 | 53.4 | Present. |
| XX | Waxy Corn Starch | ___do___ | 27.0 | 6.0 | 2.8 | 6.0 | 9.0 | 1.9 | 8.0 | Absent. |

[1] Amioca 50 is a modified (by acid hydrolysis or otherwise) waxy corn starch manufactured by National Starch Products, Inc.

*Example V*

This example illustrates the preparation of a non-thixotropic adhesive based on refined waxy sorghum flour in the carrier and grain sorghum flour plus a small amount of refined waxy sorghum flour in the secondary.

The flours are commonly supplied in bags containing 100 lbs. of flour. The user wishes to use only whole bags of flour in each batch of adhesive. To do this he adds to the secondary that portion of the 100 lb. bag of waxy flour which is not used in the carrier. In this example the ratio of waxy flour to regular flour is 1 to 5 (i.e., one bag of waxy flour to 5 bags of regular flour).

Part 1 (carrier): Parts by weight
    Water _____ 398.0
    Refined waxy grain sorghum flour ____ 28.6
    Sodium hydroxide _____ 5.2
Part 2 (secondary):
    Water _____ 604.3
    Borax _____ 6.9
    Grain sorghum flour _____ 216.7
    Refined waxy grain sorghum flour ____ 14.8

An inspection of the Brookfield viscosity data of the various examples in Table 1 reveals at once the beneficial effects produced, in the elimination of thixotropy, by the use of a waxy component in the carrier by comparing the following examples:

(1) The waxy corn starch in Example VIII vs. corn starch in Example VII.

(2) Whole waxy grain sorghum flour in Example XIII vs. grain sorghum flour in Example VI.

(3) Waxy corn starch in Example XVI vs. corn starch in Example XV.

(4) Waxy corn starch in Example XVIII vs. rice flour in Example XVII; and (5) Waxy corn starch in Example XX vs. wheat flour in Example XIX.

Illustratively, the corrugating adhesive composition of Example II and other compositions containing the waxy starch and waxy flour in the carrier and sorghum flour in the secondary were utilized for laminating and bonding corrugated paperboard with a standard corrugating machine, in the manner as described for starch corrugating adhesives in Bauer Patent 2,051,025. During pumping and recirculation the viscosity of the compositions remained almost constant and a slight change was attributed to evaporation losses. In the standard corrugating machine, operated at speeds up to 400-500 ft. per minute, the adhesive compositions maintained good flow properties and provided a bond comparable to standard starch corrugating adhesives. Further, the adhesive compositions were utilized to successfully laminate and bond similar and different paper materials and for laminating fabrics.

It will be apparent that many modifications and variations of this invention as hereinafter set forth may be made without departing from the spirit and scope thereof. The specific embodiments described are given by way of example and invention is limited only by the terms of the appended claims.

I claim:

1. A non-thixotropic corrugating adhesive consisting of about 75-95% water and about 5-25% solids; said solids portion consisting of about 24-33 parts of a carrier material selected from the group consisting of gelatinized waxy starches and gelatinized waxy flours consisting essentially of 100% amylopectin, about 193-243 parts of an ungelatinized starchy cereal flour, about 4.9-10.4 parts of a caustic alkali, and about 4.9-7.4 parts of a borate salt.

2. The adhesive of claim 1, in which the carrier material is gelatinized waxy corn starch and the ungelatinized starchy cereal flour is ungelatinized corn flour.

3. The adhesive of claim 1, in which the carrier material is gelatinized waxy corn starch and the ungelatinized starchy cereal flour is ungelatinized sorghum flour.

4. The adhesive of claim 1, in which the carrier material is gelatinized waxy sorghum flour and the ungelatinized starchy cereal flour is ungelatinized corn flour.

5. The adhesive of claim 1, in which the carrier material is gelatinized waxy sorghum flour and the ungelatinized starchy cereal flour is ungelatinized sorghum flour.

References Cited in the file of this patent

UNITED STATES PATENTS

| | | |
|---|---|---|
| 1,245,984 | Satow | Nov. 6, 1917 |
| 2,212,557 | Bauer | Aug. 27, 1940 |
| 2,419,160 | Pierson | Apr. 15, 1947 |
| 2,610,136 | Casey et al. | Sept. 9, 1952 |
| 2,791,512 | Hatch et al. | May 7, 1957 |
| 2,833,662 | Thomas | May 6, 1958 |

OTHER REFERENCES

H. H. Schopmeyer et al.: Ind. Eng. Chem., vol. 35, No. 11, pages 1168-1172, 1943.

UNITED STATES PATENT OFFICE
CERTIFICATE OF CORRECTION

Patent No. 2,999,028                               September 5, 1961

James W. Horner, Jr.

It is hereby certified that error appears in the above numbered patent requiring correction and that the said Letters Patent should read as corrected below.

In the grant, lines 2 and 3, for "Daniels-Midland Company, of Hennepin, Minnesota, a corporation of Delaware," read -- Archer-Daniels-Midland Company, of Minneapolis, Minnesota, a corporation of Delaware, --; line 12, for "Daniels-Midland Company, its successors" read -- Archer-Daniels-Midland Company, its successors --; in the heading to the printed specification, lines 5 and 6, for "Daniels-Midland Company, Hennepin, Minn., a corporation of Delaware" read -- Archer-Daniels-Midland Company, Minneapolis, Minn., a corporation of Delaware --.

Signed and sealed this 10th day of July 1962.

(SEAL)
Attest:

ERNEST W. SWIDER                                       DAVID L. LADD
Attesting Officer                                         Commissioner of Patents